United States Patent [19]

Schmidt

[11] Patent Number: 5,148,624
[45] Date of Patent: Sep. 22, 1992

[54] MOUSETRAP

[76] Inventor: George A. Schmidt, 1852 Kirby Rd., Glendale, Calif. 91208

[21] Appl. No.: 684,049

[22] Filed: Apr. 10, 1991

[51] Int. Cl.⁵ .............................................. A01M 23/30
[52] U.S. Cl. ........................................ 43/81; 43/81.5; 43/83
[58] Field of Search ...................... 43/81, 81.5, 82, 83, 43/83.5

[56] References Cited

U.S. PATENT DOCUMENTS

| D. 155,513 | 10/1949 | Jones | D22/119 |
|---|---|---|---|
| D. 260,801 | 9/1981 | Adams | D22/18 |
| D. 275,511 | 9/1984 | Nagel | D22/18 |
| 1,342,255 | 6/1920 | Doust | 43/82 |
| 1,458,404 | 6/1923 | Goodman | 43/82 |
| 1,462,739 | 7/1923 | Champlin | 43/83 |
| 1,588,083 | 6/1926 | Worsley | 43/83 |
| 1,611,010 | 12/1926 | Evans | 43/83 |
| 1,967,179 | 7/1934 | Schocke | 43/81 |
| 2,511,519 | 6/1950 | Van Brunt | 43/83 |
| 2,525,533 | 10/1950 | Dunkelberger | 43/83.5 |
| 2,640,293 | 6/1953 | Cook | 43/81 |
| 2,702,443 | 2/1955 | Bruske | 43/81 |
| 2,716,835 | 9/1955 | Siegel | 43/95 |
| 3,045,384 | 7/1962 | Gruschow et al. | 43/81.5 |
| 4,574,519 | 3/1986 | Eckebrecht | 43/81 |
| 4,607,450 | 8/1986 | Kaiser et al. | 43/83 |
| 4,711,049 | 12/1987 | Kness | 43/81 |

FOREIGN PATENT DOCUMENTS

| 125226 | 9/1947 | Australia | 43/81 |
|---|---|---|---|
| 9004920 | 5/1990 | PCT Int'l Appl. | 43/82 |

Primary Examiner—Richard K. Seidel
Assistant Examiner—Patty E. Hong
Attorney, Agent, or Firm—George A. Schmidt

[57] ABSTRACT

An improved mousetrap is provided featuring a handle that is remote from the trapping mechanism so that the mousetrap may be set for use without endangering one's hands or fingers. The mousetrap includes a cover that serves a fourfold function of protecting humans from the trapping mechanism, shielding captured animals from sight, defining a single deadly pathway for an animal to advance upon bait on the mousetrap, and providing decorative indicia. The handle protrudes from the cover which encloses a spring-biased jaw frame, trigger, and catch member of the mousetrap. The jaw frame is pivotally mounted to a base such that the jaw frame pivots between a cocked position, whereat the catch member retains the jaw frame in an orientation perpendicular to the base, and a shut position. Movement of the trigger by an animal causes the catch member to release the jaw frame so that the mousetrap snaps shut.

11 Claims, 5 Drawing Sheets

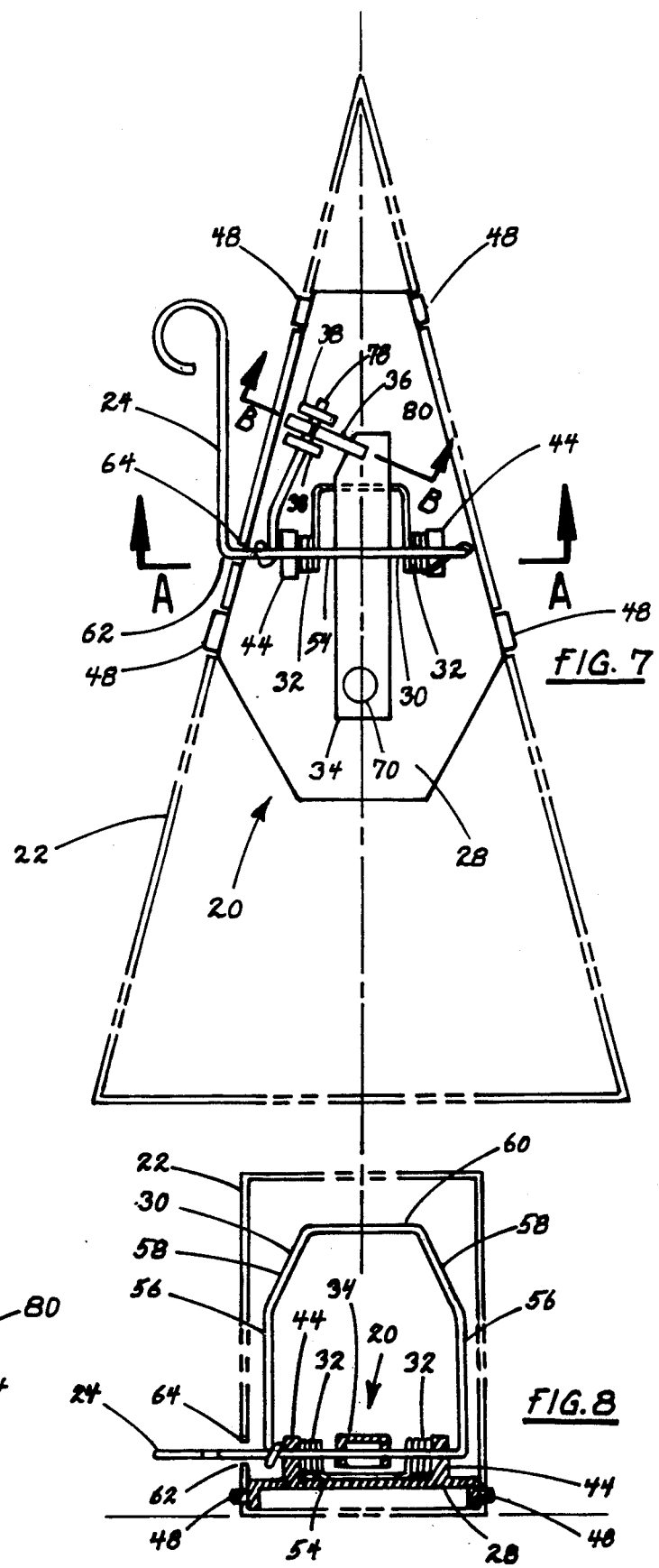

MOUSETRAP

BACKGROUND OF THE INVENTION

This invention relates generally to animal traps, especially traps for rodents. More particularly, this invention relates to an improved mousetrap that includes a trapping mechanism which can be set without risking bodily harm, a handle that is remote from a jaw of the trapping mechanism and that stands upright when the trapping mechanism is sprung, thereby providing means to discard a trapped, dead rodent while grasping the mousetrap at a location remote from the captured animal, and an advantageous exterior cover that provides benefits to be described hereinafter.

Various types of traps to catch and/or kill rodents are well known. Conventionally, mousetraps include a bar (or jaw) that is spring mounted and which pivots from a cocked position to a sprung position in response to the trap being tripped by an animal. Unfortunately, there are many disadvantages associated with conventional mousetraps.

First of all, the setting of conventional traps is often hazardous to the hands and fingers, since it is usually necessary to place the hands and fingers in the path of the spring mounted jaw during setting. Occasionally, the catch mechanism of prior traps is unreliable or difficult to secure, so that the catch mechanism releases the jaw to snap shut before the person setting the trap can remove all body portions from the hazardous path of the jaw. Other problems are also associated with prior catch mechanisms. A catch mechanism must be carefully configured or else it may be too sensitive to be usable or too insentive to respond to a rodent taking the bait on the trap.

Another problem frequently encountered with the use of prior animal traps, especially mousetraps, is that the release of the trapped animal from the trap is usually a messy, unsanitary, and difficult process. Normally this process involves grasping the jaw (or jaws) which has killed the animal and moving the jaw to release the animal from the trap. This entails the unsanitary act of touching the jaw in the vicinity of the dead animal and sometimes even requires touching the animal itself. Since rodents are noted carriers of germs and disease, it is completely undesirable to require a trap user to manipulate the trap in any way which places the user's hands in the area of the captured rodent. Moreover, because a captured rodent is usually severely injured, such a trapped animal usually present a gory sight that is not well-received by a squeamish user, such as a typical housewife. Thus, it would be desirable if one were to make available an improved mousetrap that includes means for substantially shielding a dead, trapped animal from the user's sight. Furthermore, an improved trap is needed whereby the captured animal can be disposed of without ever requiring one to touch either the dead animal or the trap areas in the immediate vicinity of the animal.

Yet another problem commonly associated with prior mousetraps is that many traps are flawed in that a way exists for a lucky rodent to remove the bait from the trap without tripping said trap. For this reason, an improved mousetrap is needed which not only remedies the other problems noted above, but which also limits an animal tempted by the bait to a single deadly path for advancing upon the bait, so that all attempts to snag the bait will result in a captured animal.

Finally, it is commonplace for prior traps to utilize a jaw arrangement wherein the jaw must travel 180 degrees along an arcuate path to move from a cocked (or set) position to a sprung (or shut) position. It would be desirable to provide an improved mousetrap that supplies solutions to the previously noted problems while also requiring its jaw to travel only 90 degrees to advance from a cocked position to a sprung position. Such an arrangement is desirable in that, the less distance the jaw must travel before trapping an animal, the quicker the trap will snap shut and thus, the less chance a rodent will have of escaping or surviving.

There exists, therefore, a significant need for an improved mousetrap that can be set without hazard to the user, that shields a captured animal from sensitive eyes while still providing an indication that the trap has sprung, and that allows disposal of the captured rodent in a sanitary way using a handle that is remote from the trap area holding the animal. Moreover, such an improved mousetrap is needed which limits animals to a single deadly path for advancing upon the bait and which also addresses the other problems noted above. In a relatively inexpensive fashion, the present invention fulfills these needs and provides further related advantages.

BRIEF DESCRIPTION OF THE DRAWINGS

The accompanying drawings illustrate the invention. In such drawings:

FIG. 7 is a top plan view of the mousetrap of FIGS. 1 and 2 with the cover shown in cross section to illustrate an arrangement wherein a hexagonal mousetrap base wedges within an apex portion of a triangular cover, further illustrating a connecting member that links the exterior handle to the interior jaw frame;

FIG. 8 is a cross sectional view taken generally along line A—A of FIG. 7, illustrating the jaw frame in the cocked position and showing that the cover height must allow clearance for the jaw frame;

FIG. 9 is a side elevational view of the catch member of FIGS. 1 and 2, taken generally along the line of sight indicated by arrows B in FIG. 7, illustrating a pawl and tail of the catch member;

DETAILED DESCRIPTION OF THE PREFERRED EMBODIMENT

The improved mousetrap 20 of the present invention features many advantages that eliminate undesirable aspects generally associated with prior animal trapping devices. Foremost among these benefits is an arrangement wherein a user's hands and fingers are protected from possible entrapment by a jaw frame of the mousetrap because of a twofold safety approach featuring a cover 22 that shields one's body from contact with the trapping mechanism of the mousetrap, and a handle 24 that allows one to set the mousetrap at a location which is remote from the hazardous jaw frame.

The present invention successfully addresses another distasteful problem generally associated with prior animal traps, namely, the reluctance of a squeamish user to examine a previously set trap to see if any rodent, or the like, has been captured. This reluctance stems from the realization that trap inspection is accompanied by the risk of viewing a grotesquely mangled, captured rodent, a sight few wish to encounter. The present invention utilizes the cover 22 to completely obscure the captured animal from sight while using the position of the handle 24 to indicate, by visual inspection, whether or not the mousetrap 20 has sprung. A user need never see the pesky pest that has been exterminated.

Figure 6:
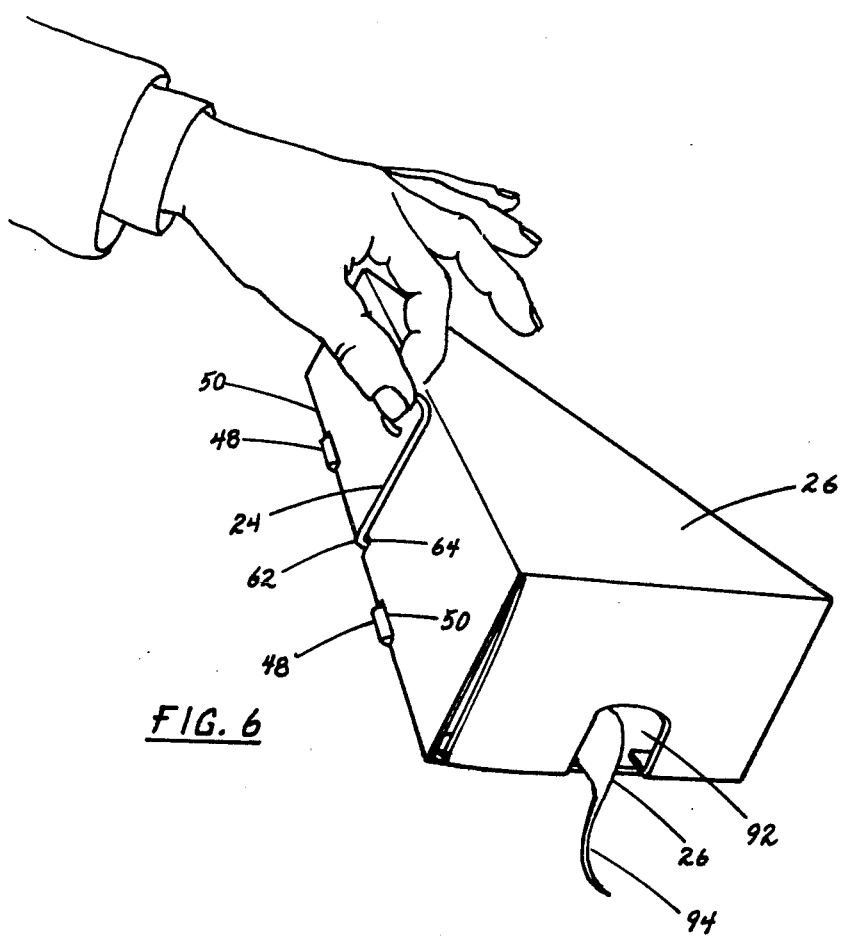
FIG. 6 is a perspective view illustrating the manner in which the handle allows for sanitary disposal of the cover and the trap and captured animal.

Yet another advantageous feature of the present invention successfully addresses the prior problem regarding disposal of an unsanitary captured rodent. The mousetrap 20 is designed to be constructed of a minimum of parts, each comprised of a relatively inexpensive plastic or metal material (with the cover 22 possibly of heavy duty cardboard) so that the invention is so inexpensive to manufacture that it is actually feasible for use as a disposable trap. Once sprung, a user merely lifts the entire mousetrap 20 and the cover 22 using the handle 24 (as shown in FIG. 6) and disposes of the trap 20 and a dead rodent 26 simultaneously. The user not only need never view the animal, but is also spared any unsanitary manipulations of the trap which usually were previously required in order to dispose of a captured rodent. The cover 22 prohibits any accidental contact between the user and the dead animal.

Thus, the present invention has, as its focal points, achievements in improving the safety and sanitary aspects of a mousetrap. The thrust of the invention is to prevent a user from ever having the trap accidentally snap shut on the hands or fingers and to eliminate the spread of germs (and thus disease) by enclosing the captured animal to prohibit contact therewith. Many other advantages shall become apparent hereinafter.

Figure 10:
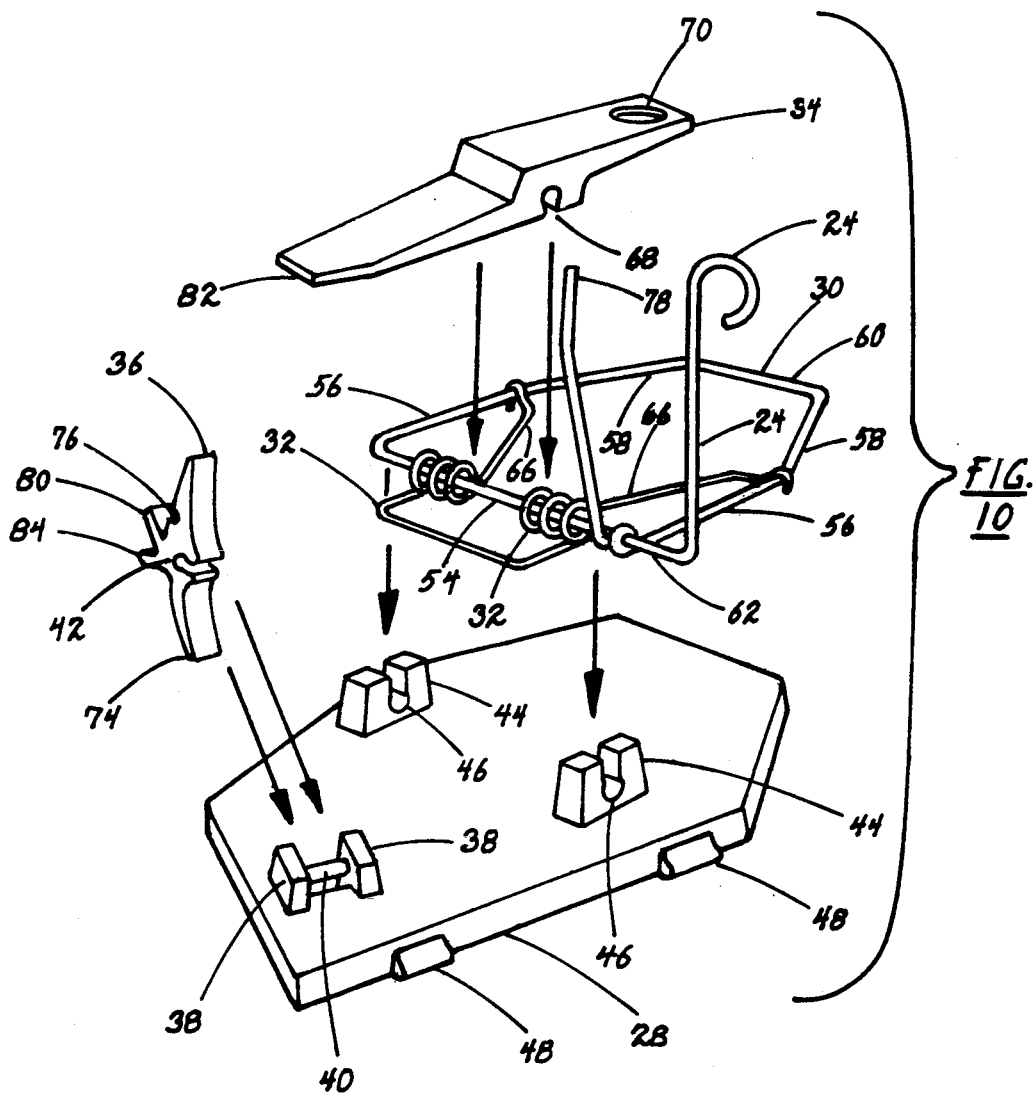
FIG. 10 is an exploded, slightly enlarged view of the mousetrap of FIGS. 1, 2, 7 and 8 illustrating the trigger, the spring wrapped around the jaw frame, the handle extending therefrom, the catch member and the base.

In accordance with the present invention, the mousetrap 20 is comprised of five elements, best viewed in the exploded view of FIG. 10. These elements are a base 28, a jaw frame 30 that also provides the handle 24, a spring 32, a trigger 34 and a catch member 36.

Figure 1:
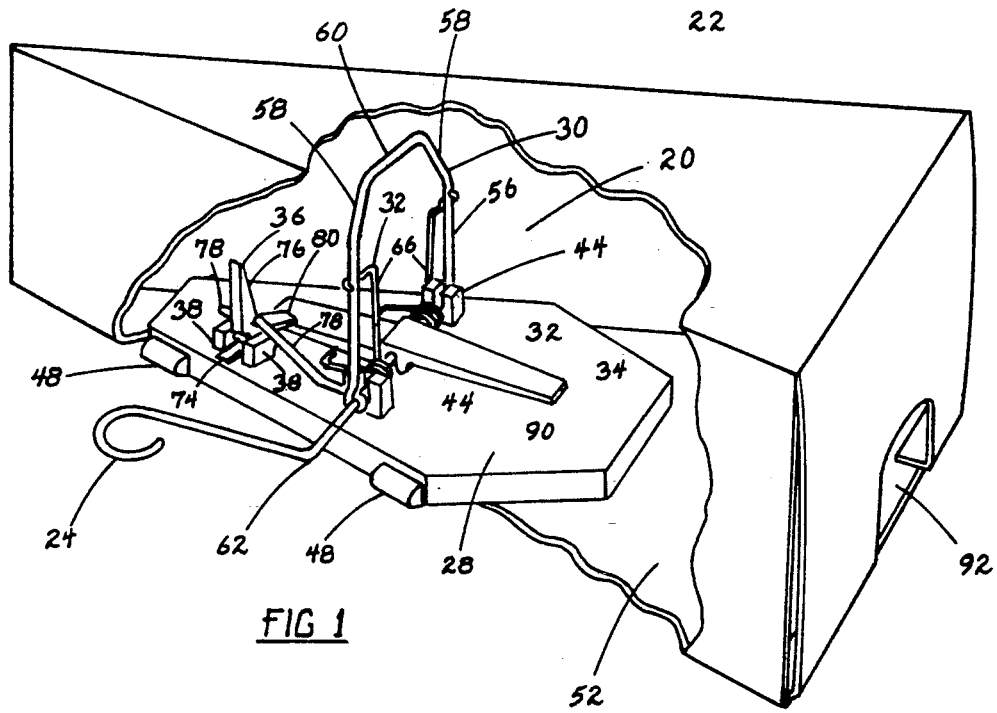
FIG. 1 is a perspective view of a mousetrap embodying the invention, also showing in cutaway, a cover that houses the mousetrap, with said mousetrap shown having its jaw frame in a cocked position, its catch member in a catch position, its handle in a cocked position and its trigger in a set position.
Figure 2:
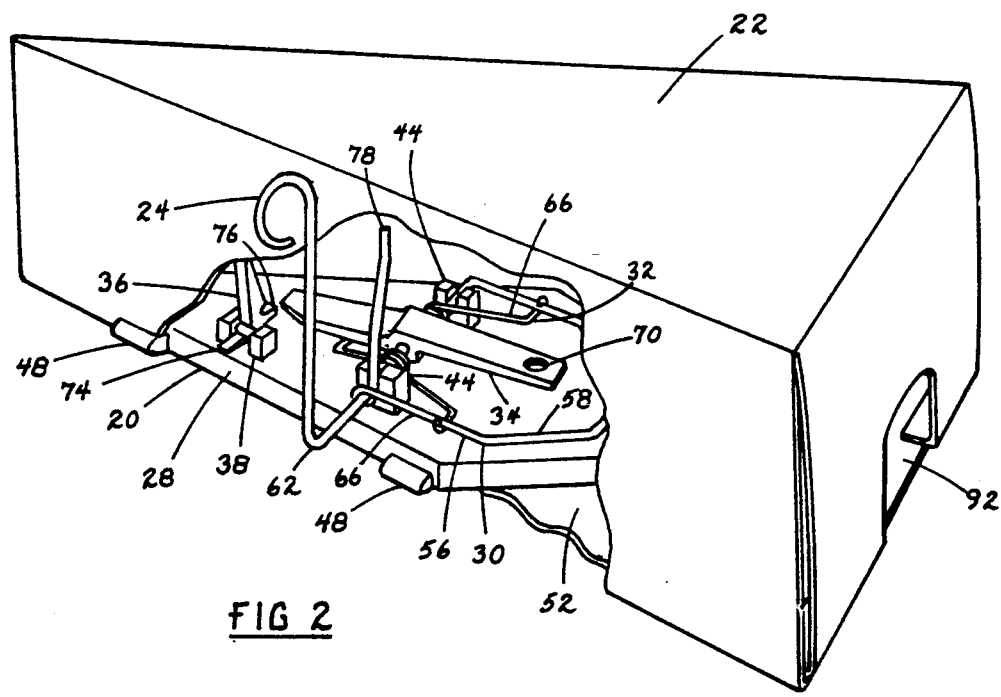
FIG. 2 is a perspective view of the mousetrap of FIG. 1, with the cover again cut-away to reveal the jaw frame in a sprung position, the catch member in a release position, the handle in a sprung position and the trigger in a trip position.

The base 28 is preferably comprised of injection molded plastic and may have cut-out portions (not shown) in order to save on material usage. The base 28 includes a pair of ears 38 that support an axle piece 40. The axle piece 40 snaps into a groove 42 on the catch member 36 such that the catch member 36 can rotate slightly about the axle piece 40, which serves as a pivot point. The base 28 also includes a pair of supports 44, each having a central groove 46 therein. The grooves 46 are sized to retain the rod-like jaw frame 30 such that said jaw frame can rapidly pivot from an upright, cocked position (FIG. 1) to a sprung position (FIG. 2). The base 28 preferably is hexagonal in shape (see FIG. 7) with two side edges being tapered to fit snugly within an apex portion of a triangular shaped cover 22. The base 28 must fit snugly within the cover 22 in order to limit an approaching animal to a single deadly pathway for advancing upon a baited trigger 34. Further, in order that a rodent may not lift the cover 22 in an attempt to snag the bait of the trap, the cover 22 and the base 28 are designed to be interlocked by a plurality of tabs 48 on the base which snap-fit into a plurality of corresponding slots 50 in the cover (see FIG. 3). The interlocking of the cover 22 with the base 28 also serves to ensure that the cover will not fall off, thereby avoiding an unsanitary situation, when the base and cover are lifted by the handle 24 as in FIG. 6. The cover and base are joined as a unit for simultaneous disposal of each. The cover 22 may also include a floor 52 to retain the base 28 within the cover 22.

As best viewed in FIGS. 8 and 10, the jaw frame 30 is hexagonal in shape and is comprised of thick wire or a metal rod. The jaw frame 30 includes an axle portion 54 that is rotatable while retained within the base supports 44. Two spaced apart, parallel side portions 56 of the jaw frame are oriented substantially perpendicular to the axle portion 54. The side portions 56 become angled segments 58 that are joined by a crossbar portion 60 that is oriented substantially parallel to the axle portion 54.

The axle portion 54 is attached to the handle 24 by a connecting member 62. Preferably, the handle 24, the connecting member 62 and the axle portion 54, as well as the side portions 56, the angled segments 58 and the crossbar portion 60 of the jaw frame 30, are all integrally formed from a rod or wire bent to the configuration illustrated in the accompanying drawings. The connecting member 62 connects the handle 24 to the jaw frame 30 such that the handle is oriented substantially perpendicular to a plane defined by the axle portion 54, the side portions 56, the angled segments 58 and the crossbar portion 60, all of which are coplanar jaw frame elements. The orientation of the handle 24 to the jaw frame 30 is such that when the trap has sprung and the jaw frame 30 has snapped shut, the handle 24 will be oriented in an upright position (FIG. 2) that is substantially perpendicular to the upper surface of the base 28. Thus, the upright handle functions as an indicator as to whether or not the trap has been sprung. The connecting member 62 joins the handle 24 to the jaw frame 30 such that when said trap is set, (with the jaw frame oriented in a cocked position substantially perpendicular to the upper surface of the base 28) the handle will be in a lowered position (FIGS. 1 and 4) whereat the handle lies in a plane that is substantially parallel to the horizontal plane defined by the upper base surface.

The cover 22 includes an aperture 64 through which the connecting member 62 passes in order to locate the handle 24 exteriorly of the cover 22, at a position remote from the trapping mechanism of the mousetrap 20. The cover 22 and the handle 24 cooperate to provide an arrangement wherein the mousetrap 20 allows a user to be notified as to whether or not the trap has sprung (by visual inspection of the handle position) without requiring one to view the captured animal (because it is obscured by the cover). After the trap has snared its prey, the handle 24 and the cover 22 cooperate to advantageously allow for sanitary disposal of the dead animal because the handle allows one to carry the trap and its captured pest to a disposal site in a manner (FIG. 6) wherein the user's fingers are remote from the unsanitary trap and animal while the cover shields said fingers therefrom, thus preventing any contact between user and the germs and disease carried by most rodents. It is intended that the entire trap, cover, and captured animal all be disposed of simultaneously, thereby eliminating any unsanitary step of removing the dead animal from the trap. Towards this end, the mousetrap 20 is constructed of a minimum number of extremely inexpensive parts.

Figure 3:
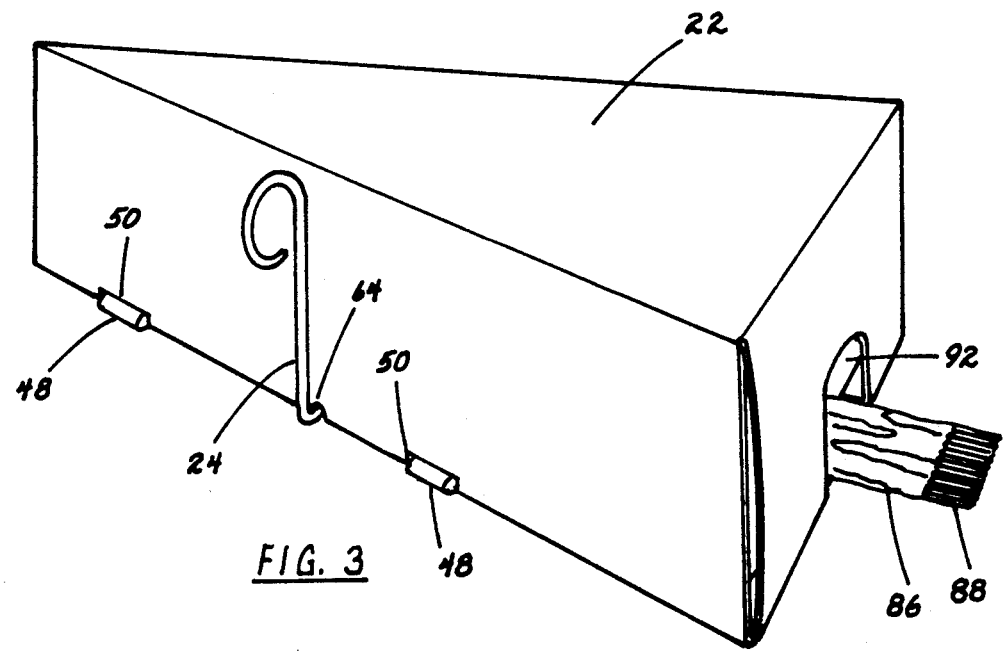
FIG. 3 is a perspective view of the cover of FIGS. 1 and 2, illustrating the handle prior to its being moved into the cocked position, also illustrating interlocking tabs that protrude from a base of the mousetrap to engage slots in the cover, and further depicting a plastic sleeve protruding from an entrance to the interior of the cover.
Figure 4:
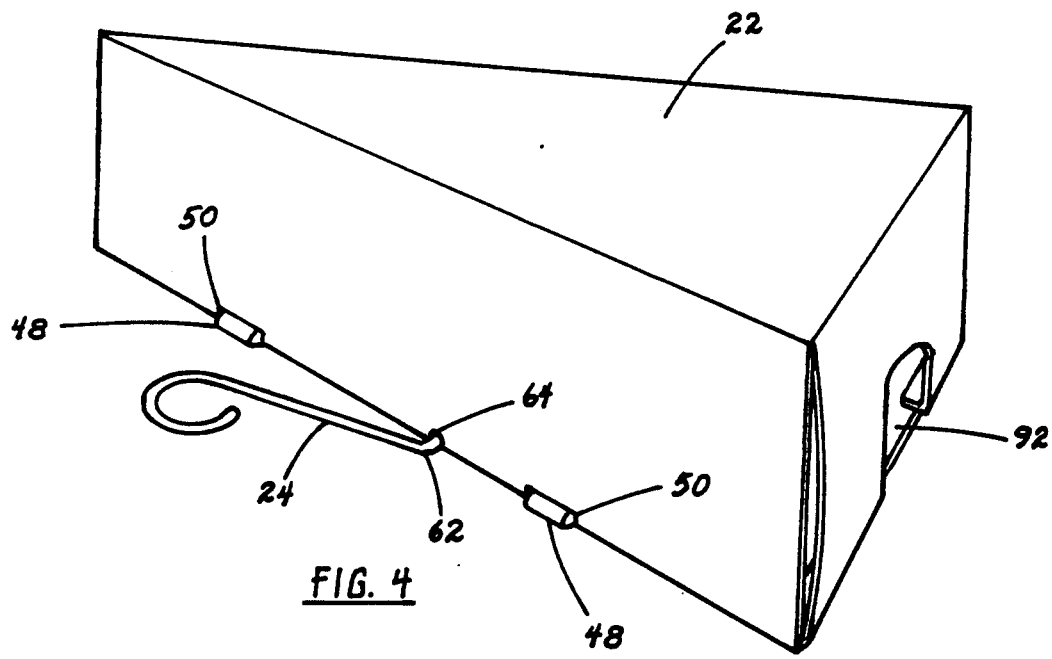
FIG. 4 is a perspective view of the cover of FIGS. 1-3, illustrating the handle in the cocked position.
Figure 5:
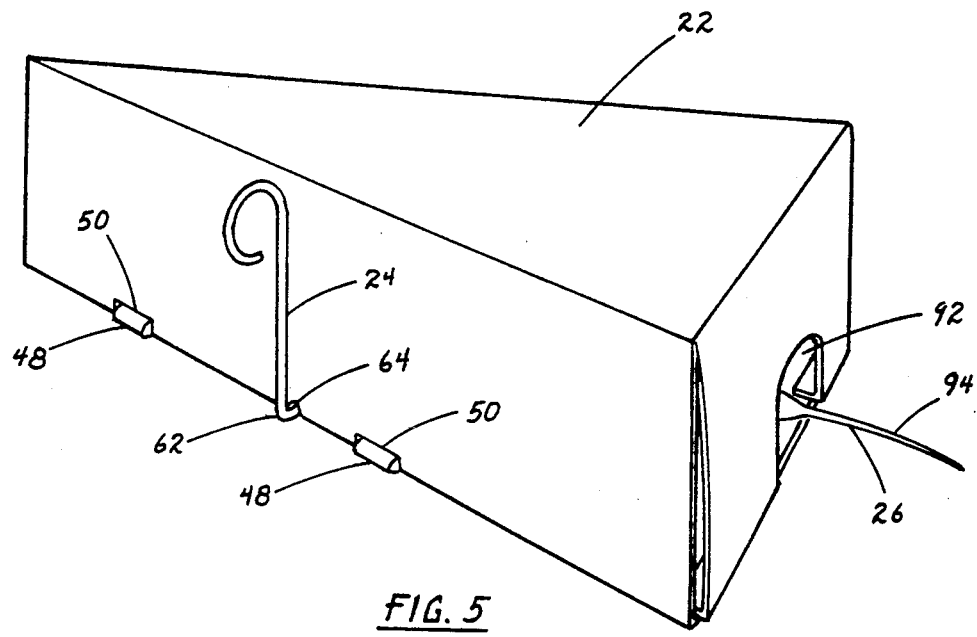
FIG. 5 is a perspective view of the cover of FIGS. 1-4, illustrating the handle in the sprung position with a rodent tail protruding from the cover entrance.

The handle 24, being remote from the dangerous pathway traveled by the jaw frame 30 and being shielded therefrom by the cover 22, provides yet another advantage. The handle allows the trap 20 to be set in a manner that eliminates the potential for one's hands to be accidentally caught (and injured) in the trap, namely, setting the trap merely requires one to manually crank the handle 24 from its sprung position (FIGS. 2 and 3) along an arcuate pathway to its cocked position (FIGS. 1 and 4). Since none of the other trap elements such as the catch member 36, the trigger 34, the spring 32 or the jaw frame 30 lie beneath or along the arcuate pathway (indicated by an arrow in FIG. 3) traveled by the handle, there is no danger that one would accidentally encounter those trap elements while manipulating the handle. Preferably, the handle 24 is configured with a finger ring at its distal end to aid in the manipulation of the handle.

The jaw frame 30 is biased toward the sprung position of FIG. 2 by the torsion spring 32 which, as best seen in FIG. 10, is configured with a pair of arms 66 each with a distal end that hooks around a side portion 56 of the jaw frame 30. Besides the engagement of the arms 66 with the jaw frame 30, the spring 32 is also operatively associated with said jaw frame because coiled spring portions surround the axle portion 54 of the jaw frame. These coiled spring portions can be located at a variety of effective locations along the axle portion 54 so long as a central segment of the axle portion is left available for a snap fit engagement into a groove 68 located in the bottom midsection of the trigger 34.

The trigger 34, preferably of plastic, pivots about a central segment of the axle portion 54 between a set position (FIG. 1) and a plurality of trip positions (i.e. any position other than the set position). The trigger 34 is shown in a trip position in FIG. 2. This trigger 34 includes one or more recesses 70 adapted to accommodate bait 72 (see FIG. 11) such as cheese and has an elongated tongue shape. The recess 70 is located proximate one end of the trigger. The opposite end of the trigger presents a flat tip adapted for operative association with the catch member 36. The trigger is shaped such that its two opposite ends are not coplanar (note FIG. 10) because the thickness of the trigger is non-uniform, with its thickest portion being at its midsection in the trigger portions surrounding the groove 68. The movement of the trigger 34 is akin to that of a see-saw.

The catch member 36 is preferably comprised of injection molded plastic. To ensure its proper functioning, the catch member (best viewed in FIGS. 9 and 10) has a downwardly extending tail 74 that must be comprised of a resilient material. This is because the tail 74 functions as a spring in that it acts against the upper surface of the base 28 to bias the catch member towards its catch position (see FIGS. 1 and 7). The catch member 36 has a pawl 76 that releasibly engages a jaw frame extension rod 78 (as in FIGS. 1 and 7) when the catch member is in the catch position. The jaw frame extension rod 78 is integrally formed with the jaw frame 30 and is oriented to be parallel with the handle 24 and perpendicular to the plane defined by the coplanar jaw frame sections referred to as the side portion 56, the angled segments 58 and the crossbar 60. Thus, since the extension rod 78 is at a right angle with respect to the rest of the coplanar jaw frame sections, the jaw frame 30 will be oriented substantially perpendicular to the upper surface of the base 28 when the extension rod 78 is held in a horizontal orientation (against the bias of the spring 32) by the pawl 76 of the catch member 36. The extension rod 78 allows the catch member 36 to hold the jaw frame in a cocked position from which the jaw frame need only travel ninety degrees to snap shut upon a pest. Many previous traps feature jaw members that must travel 180 degrees to engage the pest, so the present invention achieves a jaw frame that has less distance to travel to snap shut, thereby advantageously providing a deadlier trap that closes faster.

The catch member 36 pivots about the axle 40 on the base 28 between a catch position, whereat the flat end 82 of the trigger lies beneath a protrusion 80 of the catch member while the pawl 76 releasibly engages the extension rod 78 of the jaw frame, and a release position. Any downward or side-to-side pressure upon the baited end of the trigger 34 will cause the trigger to pivot like a seesaw, thereby moving the flat end of the trigger upwardly. The flat trigger end 82 will act against the protrusion 80 on the catch member as the flat end pivots upwardly. In this manner, the trigger forces the catch member to the release position, whereat the pawl 76 disengages from the extension rod 78, thereby freeing the jaw frame 30 for movement to the sprung position. This action occurs extremely rapidly due to the action of the spring 32 which causes the jaw frame to snap shut. The resilient tail 74 of the catch member bendably yields to allow the trigger end 82 to force the catch member to the release position. The catch member 36 also includes a downwardly extending stop 84 which limits the pivotal range of motion of the catch member so that the catch member cannot pivot beyond the catch position to an orientation which would be unsuitable for engaging the extension rod 78 of the jaw frame.

Figure 11:
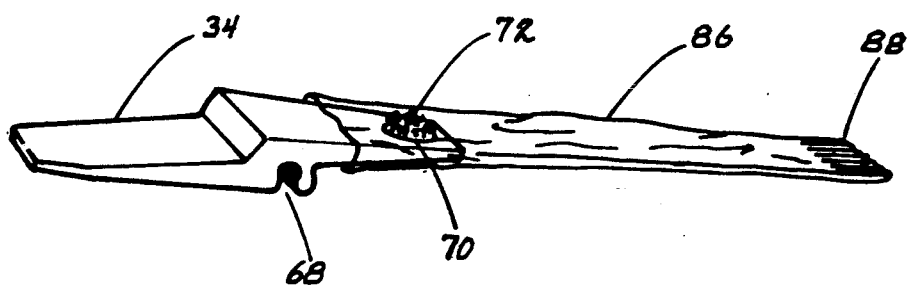
FIG. 11 is a perspective view of the trigger of FIG. 10 having bait thereon, said bait being shown sealed in an airtight plastic sleeve.

Besides the myriad advantages of shielding one's hands and fingers from hazards, hiding the captured animal from sight, and allowing for sanitary disposal, the mousetrap 20 is designed with the further improvement of facilitating pre-baiting (i.e. baiting before distribution) of the mousetrap. Towards this end, FIG. 11 depicts a removable plastic sleeve 86 having a closed end 88 and an opposite end 90 that is configured to accommodate the bait 72 and the baited end of the trigger 34 therein. The end 90 of the plastic sleeve 86 is sealed about the trigger air tight in order to preserve the bait 72 that is prepackaged by the sleeve 86. FIG. 3 illustrates that the closed end 88 protrudes from an entrance 92 of the cover 22 when the mousetrap 20 is initially purchased by a consumer. The plastic sleeve 86 will easily pull off from the trigger 34 by yanking upon the closed end 88. However, removal of the plastic sleeve will not dislodge the bait 72 from the trigger 34 because the bait is captured by the recess (or recesses) 70 in the trigger. Conveniently, the consumer merely needs to slip off the plastic sleeve 86 and crank the handle 24 to the cocked position (thereby leaving the invention in the state shown in FIG. 4) and the mousetrap 20 is armed and ready. The advantage of providing a pre-baited trigger is that this feature eliminates the many accidents that occurred when users attempted to bait prior traps. It previously was a likely scenario that one baiting a prior trap would encounter the unpleasant jaw snapping action of the trap if not careful. This pre-baited trap is in accordance with the overall theme of safety and sanitation which is this invention's focal point. A variety of conventional shrink wrapping or vacuum packing techniques can be used to seal the plastic sleeve 86 around the bait 72 and the trigger 34.

The cover 22 can be comprised of folded heavy duty cardboard or inexpensive plastic. The configuration of the cover (i.e. its triangular shape and the fact that the cover walls taper towards the mousetrap 20) is designed with function in mind. The cover provides means for limiting the approach towards the bait to a single deadly pathway. That is, the entrance 92, and the positioning of the hexagonal base 28 within the cover 22 are arranged such that the cover "funnels" the animal to the bait, while denying any safe, alternative pathways to the bait. The cover 22 preferably is adorned with indicia (not shown) such as a cheese facade to enhance the fact that this mousetrap is intended to never become an eyesore (mainly because a mangled captured pest is always obscured from sight). Any appealing indicia is suitable for the cover 22. Moreover, the cover 22 and the base 28 can be interlocked by alternative arrangements other than the cooperating tabs 48 and slots 50.

In keeping with a major thrust of this invention, namely sparing squeamish eyes from any gory sights, the mousetrap 20 may be situated within the cover 22 such that only the tail 94 will be visible through the entrance 92 when the trap snaps shut upon its prey. Of course, it may be preferable that the trap be located further away from the entrance so that absolutely no portion of a captured animal will be visible from a vantage point exterior of the cover 22.

While a particular form of the invention has been illustrated and described, it will be apparent that various modifications can be made without departing from the spirit and scope of the invention. Accordingly, it is not intended that the invention be limited, except as by the appended claims.

I claim:

1. An animal trap comprising:
   a base having an upper surface, a front end, a rear end, a first side edge and a second side edge;
   a jaw frame pivotally mounted on said base for pivotal movement between a cocked position and a sprung position;
   spring means for biasing said jaw frame towards said sprung positions;
   a catch member pivotally mounted on said base for pivotal movement between a catch position and a release position, said catch member having means for releasibly engaging said jaw frame when said jaw frame and said catch member are in said cocked position and said catch position, respectively, said catch member being pivotable to said release position to move said engaging means out of engagement with said jaw frame, thereby freeing said jaw frame for movement to said sprung position;
   a trigger member pivotally mounted to said base for pivotal movement between a set position and at least one trip position, said trigger member including a trigger portion adapted for operative association with said catch member, said trigger portion being positioned for manipulating said catch member when said catch member and said trigger member are in said catch position and said set position, respectively, said trigger portion forcing said catch member to said release position whenever said trigger member moves to said trip position, thereby freeing said jaw frame from releasible engagement with said catch member to permit said jaw frame to move to said sprung position;
   cover means about said base, said cover means for prohibiting a human from contacting the trigger member and the catch member; and means for releasibly interlocking said base with said cover means, wherein said interlocking means includes at least one tab protruding from a side edge of said base and at least one slot located on said cover means so as to align with said tab for releasible engagement therewith.

2. An animal trap as set forth in claim 1 wherein said means for releasibly engaging the jaw frame comprises a pawl and wherein said catch member includes a downwardly extending tail that contacts said upper surface of the base, wherein the tail acts against the base to bias the catch member towards the catch position, and wherein the tail is comprised of a resilient material such that said tail bendably yields to allow the trigger portion to force the catch member to the release position.

3. An animal trap as set forth in claim 2, wherein said catch member is configured with a tail that is oriented substantially perpendicular to the pawl, said pawl being substantially vertically oriented relative to horizontal, said catch member further being configured with a downwardly extending stop that acts against said base to provide means for limiting the pivotal range of motion of the catch member, and with an outwardly extending protrusion that is acted upon by said trigger portion when said trigger member pivots to said trip position, wherein action of said trigger portion against said protrusion will force said catch member to said release position.

4. An animal trap as set forth in claim 3, wherein said protrusion is oriented substantially perpendicular to said pawl, and wherein said protrusion and said tail extend from said catch member in opposing directions.

5. An animal trap as set forth in claim 4, wherein said catch member is comprised of a resilient plastic material.

6. An animal trap as set forth in claim 1, wherein said cover means comprises a triangular cover, and wherein said base has a hexagonal shape with two opposing sides of said base being tapered to snugly align within an apex portion of said triangular cover.

7. An animal trap as set forth in claim 1, wherein said base, jaw frame, catch member, and trigger member are located within an interior volume defined by said cover means.

8. An animal trap as set forth in claim 1, wherein said trigger member includes an area adapted to accommodate bait thereon, said trap in combination with bait, wherein said bait is accommodated within said bait area, and further including a removable plastic sleeve having a first end that is closed and a second end that is configured to accommodate a portion of the trigger member therein, said second end being sealed about said trigger member such that said plastic sleeve defines an enclosed volume that encompasses said bait and said bait area.

9. An animal trap comprising:
- a base having an upper surface, a front end, a rear end, a first side edge and a second side edge;
- a jaw frame pivotally mounted on said base for pivotal movement between a cocked position and a sprung position;
- spring means for biasing said jaw frame towards said sprung position;
- a catch member, wherein said base provides means for pivotally mounting said catch member thereon, said catch member being pivotable between a catch position and a release position, said catch member having means for releasibly engaging said jaw frame when said jaw frame and said catch member are in said cocked position and said catch position, respectively, said catch member being pivotable to said release position to move said engaging means out of engagement with said jaw frame; thereby freeing said jaw frame for movement to said sprung position;
- a trigger member pivotally mounted to said base for pivotal movement between a set position and at least one trip position, said trigger member including a trigger portion adapted for operative association with said catch member, said trigger portion being positioned for manipulating said catch member when said catch member and said trigger member are in said catch position and said set position, respectively, said trigger portion forcing said catch member to said release position whenever said trigger member moves to said trip position, thereby freeing said jaw frame from releasible engagement with said catch member to permit said jaw frame to move to said sprung position; and
- a handle connected to said jaw frame such that said handle is pivotable with said jaw frame between said cocked position and said sprung position, and wherein movement of the jaw frame to said sprung position orients said handle in an upright alignment whereat said handle is substantially perpendicular to said upper surface of the base, wherein a connecting member joins said jaw frame to said handle, said connecting member extending outwardly from the base, beyond said first side edge, such that the connecting member positions the handle at a remote locale spaced outwardly from the base, wherein at said locale said handle continually is positioned apart from said base as said handle pivots between said cocked position and said sprung position along an arcuate pathway, wherein said handle and said base are in offset relation such that the spring means, the catch member, and the trigger member on the base do not lie beneath said arcuate pathway traveled by said handle: further including cover means about said base, said cover means for prohibiting a human from contacting the trigger member and the catch member; and
- further including means for releasibly interlocking said base with said cover means;

wherein said interlocking means includes at least one tab protruding from a side edge of said base and at least one slot located on said cover means so as to align with said tab for releasible engagement therewith.

10. An animal trap comprising:
- a base having an upper surface, a front end, a rear end, a first side edge and a second side edge;
- a jaw frame pivotally mounted on said base for pivotal movement between a cocked position and a sprung position;
- spring means for biasing said jaw frame towards said sprung position;
- a catch member, wherein said base provides means for pivotally mounting said catch member thereon, said catch member being pivotable between a catch position and a release position, said catch member having means for releasibly engaging said jaw frame when said jaw frame and said catch member are in said cocked position and said catch position, respectively, said catch member being pivotable to said release position to move said engaging means out of engagement with said jaw frame; thereby freeing said jaw frame for movement to said sprung position;
- a trigger member pivotally mounted to said base for pivotal movement between a set position and at least one trip position, said trigger member including a trigger portion adapted for operative association with said catch member, said trigger portion being positioned for manipulating said catch member when said catch member and said trigger member are in said catch position and said set position, respectively, said trigger portion forcing said catch member to said release position whenever said trigger member moves to said trip position, thereby freeing said jaw frame from releasible engagement with said catch member to permit said jaw frame to move to said sprung position; and
- a handle connected to said jaw frame such that said handle is pivotable with said jaw frame between said cocked position and said sprung position, and wherein movement of the jaw frame to said sprung position orients said handle in an upright alignment whereat said handle is substantially perpendicular to said upper surface of the base, wherein a connecting member joins said jaw frame to said handle, said connecting member extending outwardly from the base, beyond said first side edge, such that the connecting member positions the handle at a remote locale spaced outwardly from the base, wherein at said locale said handle continually is positioned apart from said base as said handle pivots between said cocked position and said sprung position along an arcuate pathway, wherein said handle and said base are in offset relation such that the spring means, the catch member, and the trigger member on the base do not lie beneath said arcuate pathway traveled by said handle; said trap in combination with bait, wherein said trigger member includes an area adapted to accommodate said bait, wherein said bait is accommodated within said bait area, and further including a removable plastic sleeve having a first end that is closed and a second end that is configured to accommodate a portion of the trigger member therein, said second end being sealed about said trigger member such that said plastic sleeve defines an enclosed volume that encompasses said bait and said bait area.

11. An animal trap as set forth in claim 10, wherein said bait area comprises one or more recesses in said trigger member.

* * * * *